United States Patent [19]

Ishikawa

[11] Patent Number: 5,708,868
[45] Date of Patent: Jan. 13, 1998

[54] LENS BARREL

[75] Inventor: Masanori Ishikawa, Tokyo, Japan

[73] Assignee: Canon Kabushiki Kaisha, Tokyo, Japan

[21] Appl. No.: 774,963

[22] Filed: Dec. 27, 1996

[30] Foreign Application Priority Data

Jan. 8, 1996 [JP] Japan .................... 8-018386

[51] Int. Cl.$^6$ .................................. G03B 13/36
[52] U.S. Cl. .................................. 396/71
[58] Field of Search ................ 396/71; 348/347

[56] References Cited

U.S. PATENT DOCUMENTS

| | | | |
|---|---|---|---|
| 4,531,158 | 7/1985 | Murakami et al. | 348/347 X |
| 4,963,910 | 10/1990 | Ishimura | 354/400 |
| 5,231,444 | 7/1993 | Watanabe et al. | 396/71 |
| 5,371,566 | 12/1994 | Asakura | 396/71 |
| 5,548,369 | 8/1996 | Iijima | 396/71 |

FOREIGN PATENT DOCUMENTS 63-200132  8/1988  Japan .
7-92373  4/1995  Japan .

*Primary Examiner*—W. B. Perkey
*Attorney, Agent, or Firm*—Fitzpatrick, Cella, Harper & Scinto

[57] ABSTRACT

The present invention relates to a lens barrel with an extender attachable thereto, and comprises a focusing lens movable in directions of an optical axis, a position detecting member for detecting a position of the lens, a data detecting member for detecting information on the extender, and a forbidding member for setting a permissible area in which the autofocusing is permitted with respect to the position of the lens based on the information, permitting the autofocusing when the position of the lens is within the permissible area, and forbidding the autofocusing when the position of the lens is out of the permissible area.

10 Claims, 3 Drawing Sheets

LENS BARREL

BACKGROUND OF THE INVENTION

1. Field of the Invention

The present invention relates to a lens barrel usable together with an auxiliary lens such as an extender, etc.

2. Related Background Art

A hitherto known fact is that when a teleconverter is interposed in between a camera body and a phototaking lens in order to increase a phototaking magnification, or when an intermediate ring is interposed in between the camera body and the phototaking lens in order to perform close-up phototaking, an effective FNo becomes large for a stop peculiar to the phototaking lens (which is hereinafter referred to as an "FNo"), and light beams needed for AF (autofocus) might be vignetted enough to cause an AF malfunction. Note that "FNo" is an abbreviation of an F-number.

Then, according to, e.g., Japanese Patent Application Laid-Open No. 7-92373, there is proposed a forbidding unit for forbidding the autofocus based on an output of a detecting unit, provided in an intermediate ring, for detecting a length of this intermediate ring, and an output of a storage unit for storing such a maximum length of an intermediate ring as to permit AF by a phototaking lens that is peculiar to the phototaking lens.

Depending on types of the phototaking lenses, however, the effective FNo might change with a variation in position of the focusing lens (which is hereinafter termed a "focusing position") in some lenses. If an extender such as the teleconverter and the intermediate ring is attached to that lens, the light beams for AF are not vignetted in the focusing position within a predetermined range. It, however, happens that the light beams for AF might be vignetted out of this range.

Japanese Patent Application Laid-Open No. 7-92373 does not show any contrivance in such a case, and, as a result, AF is forbidden over the entire area containing a possible-of-AF area in order to prevent the AF malfunction. The problem is therefore that performance of the phototaking lens cannot be sufficiently exhibited.

SUMMARY OF THE INVENTION

It is a primary object of the present invention to provide a lens barrel capable of making a phototaking lens sufficiently exhibit its performance.

To accomplish this object, according to one aspect of the present invention, a lens barrel comprises a movable focusing lens, a position detecting means for detecting a position of the lens, a detecting means for detecting an information on the extender, and a forbidding means for setting a permissible area in which the autofocusing is permitted with respect to the position of the lens based on the information (extender data), permitting the autofocusing when the position of the lens is within the permissible area, and forbidding the autofocusing when the position of the lens is out of the permissible area.

According to another aspect of the present invention, a camera comprises a lens barrel having a movable focusing lens, an extender attached in between the lens barrel and a camera body, a TTL autofocus system, a position detecting means for detecting a position of the lens, a data detecting means for detecting data on the extender, and a forbidding means for setting a permissible area in which the autofocusing is permitted with respect to the position of the lens based on the information (extender data), permitting the autofocusing when the position of the lens is within the permissible area, and forbidding the autofocusing when the position of the lens is out of the permissible area. "TTL" of the TTL autofocus system is an abbreviation of "Through The Lens", and this autofocus system uses the light beams passing through the phototaking lens of the lens barrel to generate a focus error signal.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Figure 1:
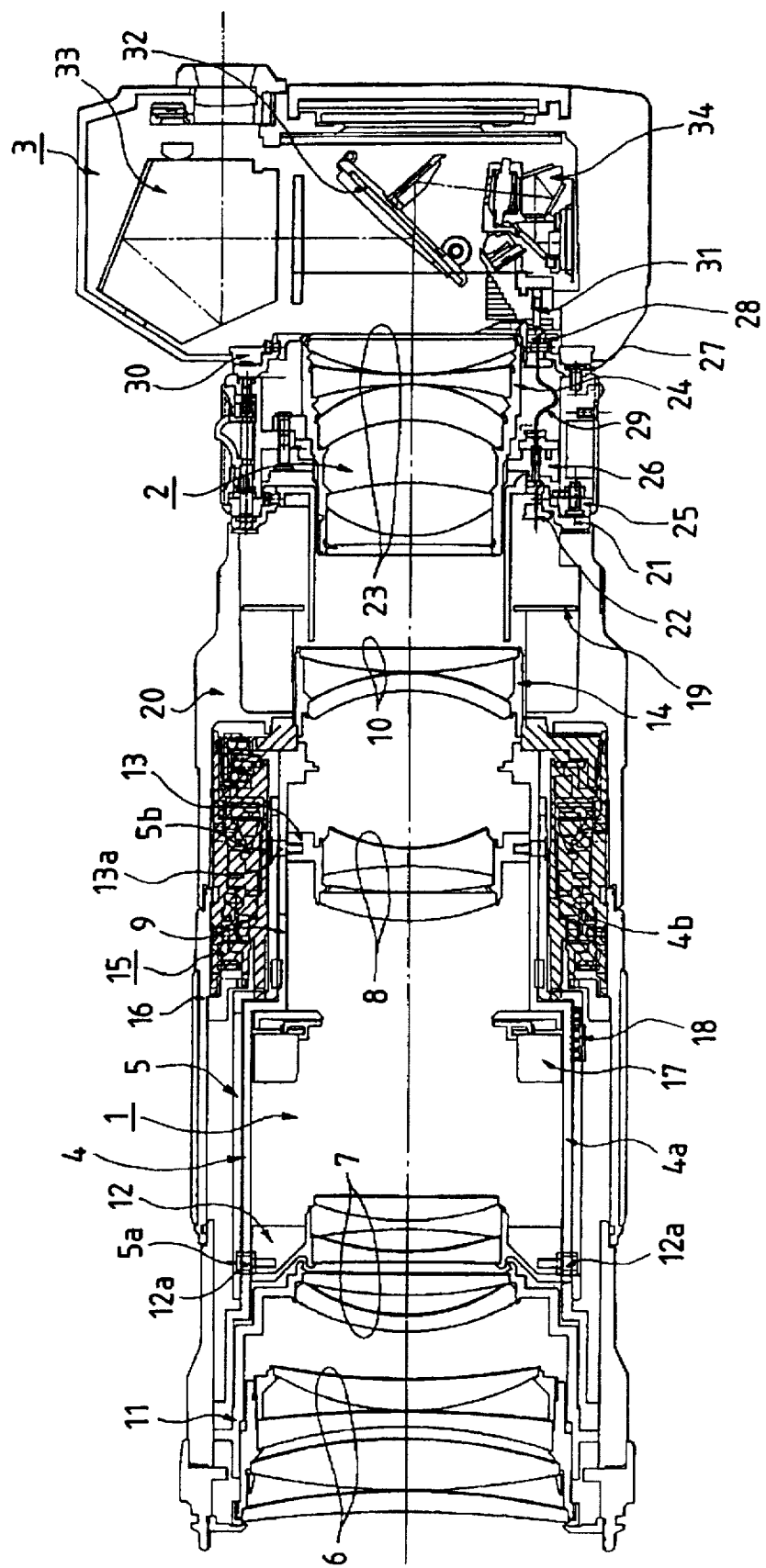
FIG. 1 is a sectional view illustrating a lens barrel in one embodiment of the present invention.

FIG. 1 is a sectional view showing a lens barrel in one embodiment of the present invention. Shown therein are a lens body 1, an extender 2 and a camera body 3. A guide ring 4 fixedly or movably holds other lens barrel and is formed with rectilinear grooves 4a, 4b serving as rectilinear guides for lens barrels 12, 13 which will be described later on.

A focus driving cam ring 5 is so held on an outer portion of the guide ring 4 as to be only rotatable. The cam ring 5 is formed with cams 5a, 5b for moving the lens barrels 12, 13. Shown also therein are a first lens unit 6 which is fixed, a second lens unit 7 for focusing, a third lens unit 8 for focusing compensation, and a fourth lens unit 10 which is fixed. When performing the autofocusing, the focusing is attained by moving the second lens unit 7 in optical-axis directions.

The lens barrel 11 for the first lens unit holds the first lens unit 6 and is fixed to the guide ring 4. The lens barrel 12 for the second lens unit holds the second lens unit 7. The lens barrel 12 has a roller 12a engaging with the cams 5a of the cam ring 5 and with the rectilinear groove 4a of the guide ring 4, and is rectilinearly moved while being held by the guide ring 4.

The lens barrel 13 for the third lens unit holds the third lens unit 8. The lens barrel 13 has a roller 13a engaging with the cam 5b of the cam ring 5 and with the rectilinear groove 4b of the guide ring 4, and is rectilinearly moved while being held by the guide ring 4. A lens barrel 14 for the fourth lens unit holds the fourth lens unit 10 and is fixed to the guide ring 4. A focus drive unit 15 synthesizes rotations inputted from a focus operation ring 16 with rotations of an actuator. This focus drive unit 15 engages with the above cam ring 5 and thus rotates the cam ring 5, thereby moving the second lens unit lens barrel 12 in the optical-axis directions to perform the focusing.

A stop unit 17 is fixedly held on the guide ring 4. An encoder 18 detects rotations of the cam ring 5. A substrate unit 19 mounted with a CPU controls the lens as a whole by communicating respectively with a focus drive unit 15, the stop unit 17, the encoder 18 and a contact point 22 electrically connected to the camera body or the extender 2 through an unillustrated flexible printed board (hereinafter referred to as a "printed board"). A fixed ring 20 holds the guide ring 4, the focus drive unit 15, the main board 19 and a mount 21 mechanically connected to the camera body.

The extender 2 incorporates a lens unit 23 for changing a magnification, a lens barrel 24 for holding the lens unit 23, a mount 25 mechanically connected to the lens side, a contact block 26 electrically connected to the lens side, a mount 27 mechanically connected to the camera side, a contact block 28 electrically connected to the camera side, and a relay printed board 29 for electrically connecting the contact blocks 26, 28 and transferring extender data to the lens side.

The camera body 3 incorporates a mount 30 mechanically connected to the lens side, a contact block 31 electrically connected to the lens side, and a mirror 32 for deflecting the light beams traveling through the above lenses and extender to a finder system 33 and an AF system 34, respectively.

With the above construction, when the cam ring 5 is rotated by the focus drive unit 15, the second lens unit lens barrel 12 and the third lens unit lens barrel 13 are moved, thereby performing the focusing. The third lens unit lens barrel (lens 8) is moved for the purpose of compensating an aberration.

Referring to FIG. 1, a focus position, i.e., a position of the focusing lens unit 7, represents an infinite distance state. The focusing in a change from this infinite distance state entails moving the second lens unit lens barrel 12 toward a film surface and the third lens unit lens barrel 13 toward an object.

As explained above, the first lens unit 6 gets farther away from the second lens unit 7 as the focusing is more effected in the closer distance state. As a result, the light beams that are to enter the second lens unit 7 are vignetted by the first lens unit 6, and it follows that an effective F-number becomes darker as the focusing position is more shifted in the closer-distance state direction.

Figure 2:
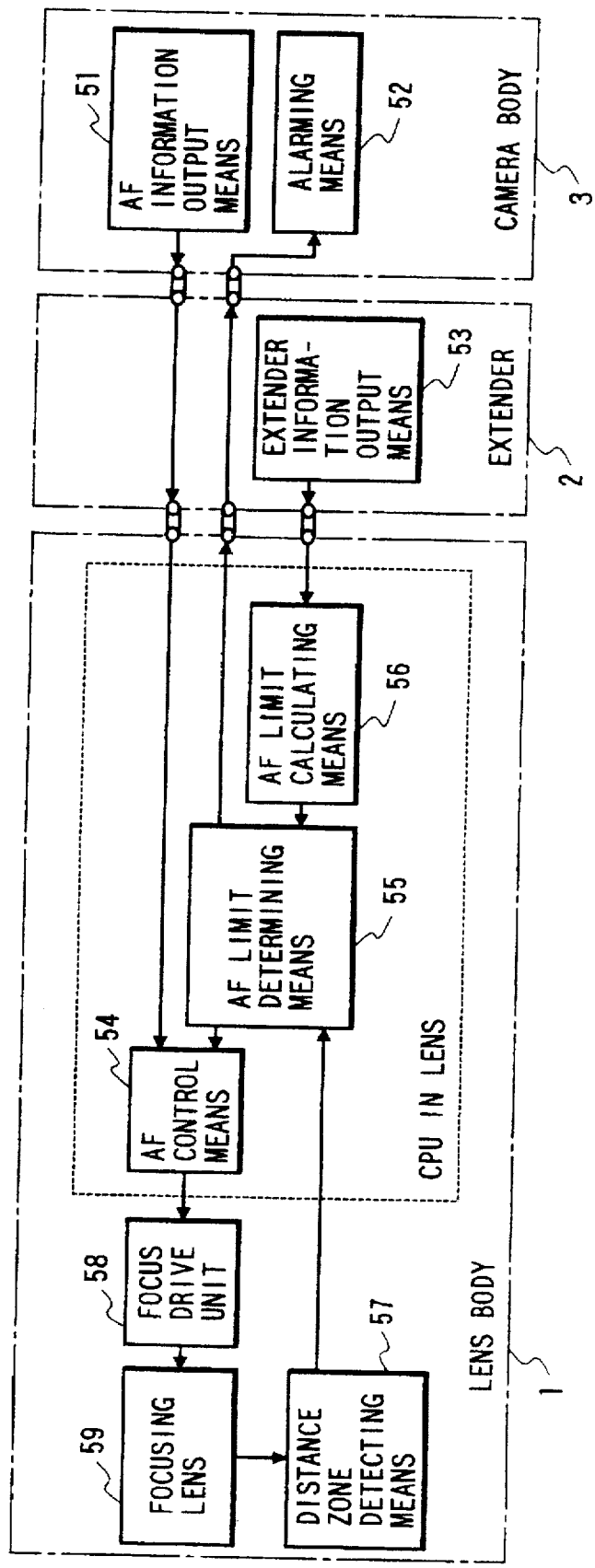
FIG. 2 is a block diagram showing a control circuit of the lens barrel in FIG. 1.

FIG. 2 is a block diagram illustrating a control circuit of the lens barrel shown in FIG. 1. AF data outputted from an AF data output unit 51 within the camera body 3 are inputted to an AF control unit 54 of the intra-lens CPU via the respective contact blocks of the camera body 3, the extender 2 and the lens body 1. The output unit 51 creates the AF data by processing the outputs from a sensor array of the AF system 34.

On the other hand, extender data on a type of extender, etc. are inputted to an AF limit calculating unit 56 serving as a calculating element within the lens body 1 via the contacts of the lens body and the extender 2 from the extender data output unit 53 incorporated into the extender 2. The AF limit calculating unit 56 calculates the effective FNo for every focusing position after attaching the extender from the inputted extender data, or the previously stored effective FNo per focusing position in combination with the above extender data. The AF limit calculating unit 56 thereby calculates a range of the AF limit focus position in which the AF light beams are not vignetted, and outputs a result of this calculation to an AF limit determining unit 55.

A distance zone detecting unit 57 serving as a lens position detecting unit constructed of the encoder 18 shown in FIG. 1 detects a present position of a focusing lens 59, and outputs focusing position data to the AF limit determining unit 55.

The AF limit determining unit 55 compares two items of data on a possible-of-autofocus focusing position range and on the present focusing position. The AF limit determining unit 55 outputs a result of the determination as to whether the autofocusing is possible or not (a possible-of-AF status, or an impossible-of-AF status), to the AF control unit 54 defined as the lens controlling element, and to an alarming unit 52 within the camera body 3 via the respective contact blocks of the lens body 1, the extender 2 and the camera body 3. The alarming unit 52, when receiving the result of the impossible-of-AF status, gives an alarm to be displayed on an unillustrated data display unit. The alarming unit may also be provided on the side of the lens body 1.

The AF control unit 54 forbids AF when in the impossible-of-AF status based on the determination data given by the AF limit determining unit 55, and controls the focus drive unit 58 (the focus unit 15 in FIG. 1) when in the possible-of-AF status. The AF control unit 54 then moves the cam ring 5 in FIG. 1 and thereby moves the focusing lens 59 consisting of the second lens unit 7 and the third lens unit 8 in FIG. 1, thus performing the focusing.

Figure 3:
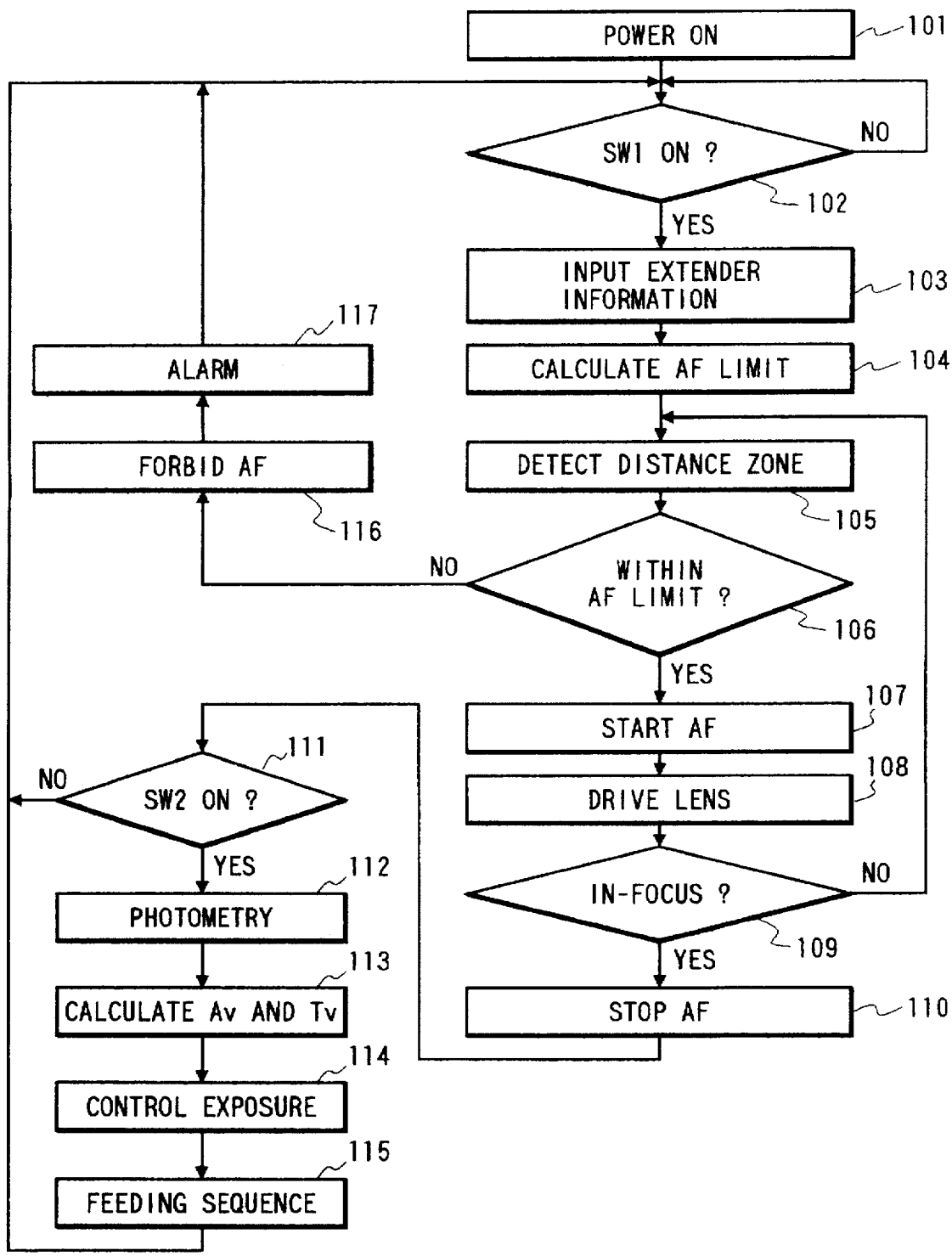
FIG. 3 is a flowchart showing an autofocus operation in the lens barrel in FIG. 1.

Next, the operation of the lens barrel shown in FIG. 1 will be explained with reference to a flowchart of FIG. 3.

To start with, when switching ON a power supply (not shown), a content of the intra-lens CPU is cleared, and, thereafter, there start a communication with the camera body 3 and a detection by a detecting unit such as each SW, etc. (step 101).

When an unillustrated release SW within a camera body 3 is depressed to a first stroke, a switch SW1 is turned ON, and the operation proceeds to step 103. Whereas if not depressed, SW1 is turned OFF, and the operation returns to a process before step 102 (step 102).

When the extender data are inputted to the intralens CPU within the lens body 1 from the extender 2 (step 103), the AF limit calculating unit 56 calculates the effective F-number FNo per focusing position from the extender data in the intra-lens CPU and the calculates a limit focusing position range in which the AF light beams are not vignetted (step 104).

When the encoder 18 shown in FIG. 1 detects the present focusing position (a distance zone) (step 105), the AF limit determining unit 55 determines whether or not the focusing lens is now in a possible-of-AF area by comparing this piece of detected present focusing position data with data on a possible-of-AF focusing position range calculated in the intra-lens CPU. If in the possible-AF area, the operation proceeds to step 107. Whereas if out of the possible-of-AF area, the operation proceeds to step 116 (step 106).

In step 107, the AF control unit 54 starts autofocusing, and a defocus quantity and a defocus direction with respect to the object are detected. These detections are repeated till the autofocusing is stopped, or till a forbidding signal is outputted. The focusing lens 59 is moved based on the detected defocus quantity and defocus direction by the focus drive unit 58 (step 108).

A focusing status is judged. If focused, the operation proceeds to step 110. Whereas if defocused, the operation returns to step 105 (step 109). In step 110, an AF stop signal is generated, thereby stopping the autofocusing.

When the release switch SW is depressed to a second stroke, a switch SW2 is turned ON, and the operation goes to step 112. Whereas if not, the switch SW2 is turned OFF, and the operation goes back to step 102 (step 111). In step 112, an intra-camera photometric sensor performs a photometric process.

Subsequently, a stop value Av and a shutter speed Tv are determined based on the obtained photometric value (step 113). Exposure control is effected based on the determined stop value Av and shutter speed Tv (step 114). Thereafter, the operation enters a feed sequence, and the film is wound up for one frame, and the operation shifts to step 102 (step 115).

If the judgement of being out of the AF limit is made in step 106, the AF limit calculating unit 56 generates the AF forbidding signal to thereby forbid the autofocusing (step 116). Then, the intra-camera-body alarming unit 52 indicates the alarm showing the impossible-of-AF status (step 117).

It is apparent that, in this invention, a wide range of different working modes can be formed based on the invention without deviating from the spirit and scope of the invention. This invention is not restricted by its specific working modes except being limited by the appended claims.

What is claimed is:

1. A lens barrel to which an extender is attachable, comprising:

a movable focusing lens;

position detecting means for detecting a position of said lens;

data detecting means for detecting an information as to said extender; and forbidding means for setting a permissible area in which autofocusing is permitted with respect to the position of said lens based on said information, permitting said autofocusing when the position of said lens is within said permissible area, and forbidding said autofocusing when the position of said lens is out of the permissible area.

2. The lens barrel according to claim 1, wherein said forbidding means has a storage means for storing a respective F-number of said lens barrel when said lens lies in each of a plurality of positions different from each other, calculates a respective effective F-number of said lens barrel after said extender has been attached thereto when said lens is in each of the plurality of positions on the basis of a storage content of said storage means and said information, and determines said permissible area based on a result of the calculation.

3. The lens barrel according to claim 1, further comprising alarming means for generating an alarm when the position of said lens lies out of said permissible area.

4. The lens barrel according to claim 3, wherein said alarming means has indicating means for giving an indication meaning that said autofocusing is forbidden.

5. The lens barrel according to claim 1, wherein said lens system has any other lens closer to an object than said lens.

6. A camera comprising:

a lens barrel having a movable focusing lens;

an extender attached in between said lens barrel and a camera body;

a TTL autofocus system;

position detecting means for detecting a position of said lens;

data detecting means for detecting an information on said extender; and forbidding means for setting a permissible area in which autofocusing is permitted with respect to the position of said lens based on said information, permitting said autofocusing when the position of said lens is within said permissible area, and forbidding said autofocusing when the position of said lens is out of said permissible area.

7. The camera according to claim 6, wherein said forbidding means has a storage means for storing a respective F-number of said lens barrel when said lens lies in each of a plurality of positions different from each other, calculates a respective effective F-number of said lens barrel after said extender has been attached thereto when said lens is in each of the plurality of positions on the basis of a storage content of said storage means and said information, and determines said permissible area based on a result of the calculation.

8. The camera according to claim 6, further comprising alarming means for generating an alarm when the position of said lens lies out of said permissible area.

9. The camera according to claim 8, wherein said alarming means has indicating means for giving an indication meaning that said autofocusing is forbidden.

10. The camera according to claim 6, wherein said lens system has any other lens closer to an object than said lens.

* * * * *

UNITED STATES PATENT AND TRADEMARK OFFICE
CERTIFICATE OF CORRECTION

PATENT NO. : 5,708,868
DATED : January 13, 1998
INVENTOR(S) : MASANORI ISHIKAWA

It is certified that error appears in the above-identified patent and that said Letters Patent is hereby corrected as shown below:

<u>COLUMN 4</u>
  Line 27, "intralens" should read --intra-lens--.
  Line 31, "the" should read --then--.

Signed and Sealed this

Twenty-fourth Day of November, 1998

Attest:

BRUCE LEHMAN

Attesting Officer

Commissioner of Patents and Trademarks